United States Patent
Butterfield et al.

(10) Patent No.: US 11,901,534 B2
(45) Date of Patent: Feb. 13, 2024

(54) AUXILIARY ENERGY SYSTEM ARCHITECTURE

(71) Applicant: Rivian IP Holdings, LLC, Irvine, CA (US)

(72) Inventors: Kyle Butterfield, Ladera Ranch, CA (US); Jorge Rodriguez, Ladera Ranch, CA (US); Nathaniel C. Wynn, Tustin, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 17/862,935

(22) Filed: Jul. 12, 2022

(65) Prior Publication Data
US 2022/0352586 A1  Nov. 3, 2022

Related U.S. Application Data

(63) Continuation of application No. 16/681,682, filed on Nov. 12, 2019, now Pat. No. 11,417,927.

(60) Provisional application No. 62/760,913, filed on Nov. 13, 2018.

(51) Int. Cl.
| | |
|---|---|
| *H01M 10/6556* | (2014.01) |
| *H01M 10/42* | (2006.01) |
| *H01M 50/204* | (2021.01) |

(52) U.S. Cl.
CPC ..... *H01M 10/6556* (2015.04); *H01M 10/425* (2013.01); *H01M 50/204* (2021.01); *H01M 2010/4271* (2013.01); *H01M 2220/20* (2013.01)

(58) Field of Classification Search
None
See application file for complete search history.

(56) References Cited

U.S. PATENT DOCUMENTS

| | | |
|---|---|---|
| 9,525,291 B1 | 12/2016 | Huynh et al. |
| 2010/0116570 A1 | 5/2010 | Sugawara et al. |
| 2011/0111268 A1 | 5/2011 | Weng et al. |
| 2012/0105001 A1 | 5/2012 | Gallegos et al. |

(Continued)

FOREIGN PATENT DOCUMENTS

| | | |
|---|---|---|
| CN | 104626997 A | 5/2015 |
| JP | 2010-113999 A | 5/2010 |

OTHER PUBLICATIONS

International Search Report and Written Opinion of PCT/US2019/060991 dated Feb. 28, 2020.

*Primary Examiner* — Wyatt P McConnell
(74) *Attorney, Agent, or Firm* — Haley Guiliano LLP

(57) ABSTRACT

A battery system of a vehicle may include a main battery pack, a secondary battery pack, and one or more secondary contactors. The main battery pack is integrated into the vehicle and includes a first plurality of battery cells, a first DC bus coupled to the first plurality of battery cells, and main contactors coupled to the first DC bus to form a switched DC bus. The secondary battery pack includes a second plurality of battery cells, and a second DC bus coupled to the second plurality of battery cells. The second DC bus of the secondary battery pack is electrically coupled to the switched DC bus of the main battery pack via the secondary contactors. In some embodiments, the main battery pack includes control circuitry configured to communicate with control circuitry of the secondary battery pack to manage or monitor coupling of the battery packs.

20 Claims, 6 Drawing Sheets

(56) References Cited

U.S. PATENT DOCUMENTS

| | | | |
|---|---|---|---|
| 2015/0280487 A1* | 10/2015 | Nakazawa | B60L 58/20 |
| | | | 320/101 |
| 2017/0120770 A1 | 5/2017 | Huynh et al. | |
| 2018/0118174 A1* | 5/2018 | Moskowitz | B60L 50/66 |
| 2019/0229381 A1* | 7/2019 | Hwang | H02J 7/0013 |
| 2020/0015294 A1 | 5/2020 | Butterfield et al. | |

* cited by examiner

AUXILIARY ENERGY SYSTEM ARCHITECTURE

CROSS-REFERENCE TO RELATED APPLICATIONS

This application is a continuation of U.S. patent application Ser. No. 16/681,682 (now allowed), filed Nov. 12, 2019, which claims the benefit of U.S. Provisional Patent Application No. 62/760,913 filed Nov. 13, 2018, the disclosures of which are hereby incorporated by reference herein in their entireties.

INTRODUCTION

The present disclosure is directed towards an auxiliary energy system, and more particularly towards an auxiliary battery pack for providing electrical power.

SUMMARY

Electric vehicles include battery packs from the factory that provide electrical energy to electric motors of the vehicle. The battery packs have an associated weight, current capacity, and operating voltage. It would be advantageous to provide a system that can be used to customize, replace, or supplement, a battery pack.

In some embodiments, the present disclosure is directed to a battery system of a vehicle. The battery system includes a main battery pack, secondary contactors, and a secondary battery pack. The main battery pack is integrated into the vehicle and includes a first plurality of battery cells, a first DC bus coupled to the first plurality of battery cells, and one or more main contactors coupled to the first DC bus to form a switched DC bus. The secondary battery pack includes a second plurality of battery cells and a second DC bus coupled to the second plurality of battery cells. The second DC bus of the secondary battery pack is electrically coupled to the switched DC bus of the main battery pack via the secondary contactors. In some embodiments, the switched DC bus includes a low voltage bus line and a high voltage bus line.

In some embodiments, the battery system includes main control circuitry coupled to the first plurality of battery cells by sensor leads. The main control circuitry is configured to manage operation of the main battery pack. In some such embodiments, the battery system includes secondary control circuitry coupled to the second plurality of battery cells by secondary sensor leads, wherein the secondary control circuitry is communicatively coupled to the main control circuitry. In some embodiments, the main battery pack includes a first communications port coupled to the main control circuitry, and the secondary battery pack includes a second communications port coupled to the secondary control circuitry. For example, the first communications port is coupled to the second communications port by a communications link.

In some embodiments, the battery system includes a DC bus cable. In some such embodiments, the main battery pack includes a first port electrically coupled to the switched DC bus, the secondary battery pack includes a second port electrically coupled to the second DC bus, and the DC bus cable is coupled to the first port and the second port. For example, this coupling electrically couples the secondary battery pack to the main battery pack. In some embodiments, the secondary battery pack is electrically coupled in parallel to the main battery pack. In some embodiments, the secondary contactors are electrically coupled between the switched DC bus and the first port of the main battery pack. In some embodiments, the secondary contactors are electrically coupled between the second DC bus and the second port of the secondary battery pack.

In some embodiments, the main battery pack includes a charging port coupled to the switched DC bus and configured to be coupled to a charging system. In some embodiments, the main battery pack includes at least one driving unit port coupled to the switched DC bus and configured to transfer electrical power with at least one electric motor.

In some embodiments, the secondary battery pack includes two or more fluid ports configured to direct a flow of coolant. In some embodiments, the secondary battery pack includes one or more coolant channels, and two or more fluid ports coupled to the coolant channels and configured to direct coolant flow. In some embodiments, the two or more fluid ports are configured to be coupled to a cooling system, wherein the cooling system is configured to cool the main battery pack.

In some embodiments, the battery system includes a pre-charge circuit configured to reduce a voltage difference between the main battery pack and the secondary battery pack prior to closing the secondary contactors.

In some embodiments, the secondary battery pack includes a removable battery pack that is removable from the vehicle.

In some embodiments, the secondary battery pack includes a permanently installed battery pack that is installed during manufacture of the vehicle.

In some embodiments, the main battery pack and the secondary battery pack have a same series count (e.g., number of battery cells in series).

In some embodiments, the present disclosure is directed to method for managing a main battery pack integrated into a vehicle, where the main battery pack includes a first plurality of battery cells, a first DC bus coupled to the first plurality of battery cells; main contactors coupled to the first DC bus to form a switched DC bus, and a port coupled to the switched DC bus. The method comprises determining a state of charge of the main battery pack and detecting connection of a secondary battery pack to the port, wherein secondary contactors selectively connect the secondary battery pack to the switched DC bus. The method further comprises determining a state of charge of the secondary battery pack and selectively connecting the main battery pack and the secondary battery pack, using the main and secondary contactors, to the switched DC bus based on the state of charge of the main battery pack and the state of charge of the secondary battery pack.

In some embodiments, the selectively connecting the main battery pack and the secondary battery pack comprises connecting the main battery pack to the switched DC bus when the state of charge of the main battery pack is lower than the state of charge of the secondary battery pack. In some embodiments, the method further comprises charging the main battery pack to reduce the difference in the state of charge between the main battery pack and the secondary battery pack.

In some embodiments, the selectively connecting the main battery pack and the secondary battery pack comprises connecting the secondary battery pack to the switched DC bus when the state of charge of the main battery pack is higher than the state of charge of the secondary battery pack. In some embodiments, the method further comprises charging the secondary battery pack to reduce the difference in the state of charge between the main battery pack and the secondary battery pack.

In some embodiments, the method further comprises connecting, using the secondary contactors, the secondary battery pack to the switched DC bus when the vehicle is being operated in a low power mode and connecting, using the main contactors and the secondary contactors, the main battery pack and the secondary battery pack to the switched DC bus when the vehicle is being operated in a high power mode.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

In some embodiments, the present disclosure is directed to an electrical architecture configured to support additional capacity to be connected to a vehicle high voltage bus. For example, a secondary battery pack (e.g., an auxiliary battery pack) may be coupled to an integrated battery pack to provide supplemental charge. The arrangements and architecture of the present disclosure may allow flexibility in the addition of energy storage to an existing system, while posing minimal constraints on either the main or auxiliary/secondary systems. For example, the systems of the present disclosure may allow electrical energy capacity to be added to a system without defining the secondary system (e.g., flexible in nature and easily integrated). For example, in the case of desired temporary or permanent increase in energy storage, a secondary system may be included. In a further example, a temporary increase in energy storage for a "road-trip" may help alleviate "range anxiety." In a further example, a permanent installation allows the secondary system to be located remotely in the vehicle. In some embodiments, the systems and architectures of the present disclosure may be applied outside of vehicle applications (e.g., in stationary energy systems).

In some embodiments, a main battery pack includes a high voltage string configured to terminate at positive and negative terminals (e.g., at electronically-controlled contactors), which distribute the high voltage (HV) power lines throughout the vehicle. In some embodiments, contactors are arranged close to the positive and negative terminals from the battery string to minimize the live potential conductors (e.g., in terms of cable length). The switched lines (e.g., DC bus lines separated from the battery strings by at least one switch) are then distributed through the vehicle (e.g., routed to required locations). The main battery pack includes a port coupled to the switched HV bus to accommodate supplementary energy capacity to the system (e.g., a secondary battery pack). The secondary energy system may be configured to conform to one or more system requirements. For example, the secondary energy system may be configured to match pack voltage, to de-energize HV poles/terminals, to communicate with a defined protocol to a main battery management system, to perform any other suitable function, or any combination thereof. If the secondary energy system is configured to be permanently installed in the vehicle, the system may be connected directly to the switched HV bus without additional contactors (e.g., using only the auxiliary contactor included in the secondary pack). The arrangement of contactors between the secondary energy system and the switched HV bus of the main pack allows added redundancy of the system for additional safety or for the ability to power the switched HV bus from either energy storage system (e.g., main, secondary, or both).

Figure 1:
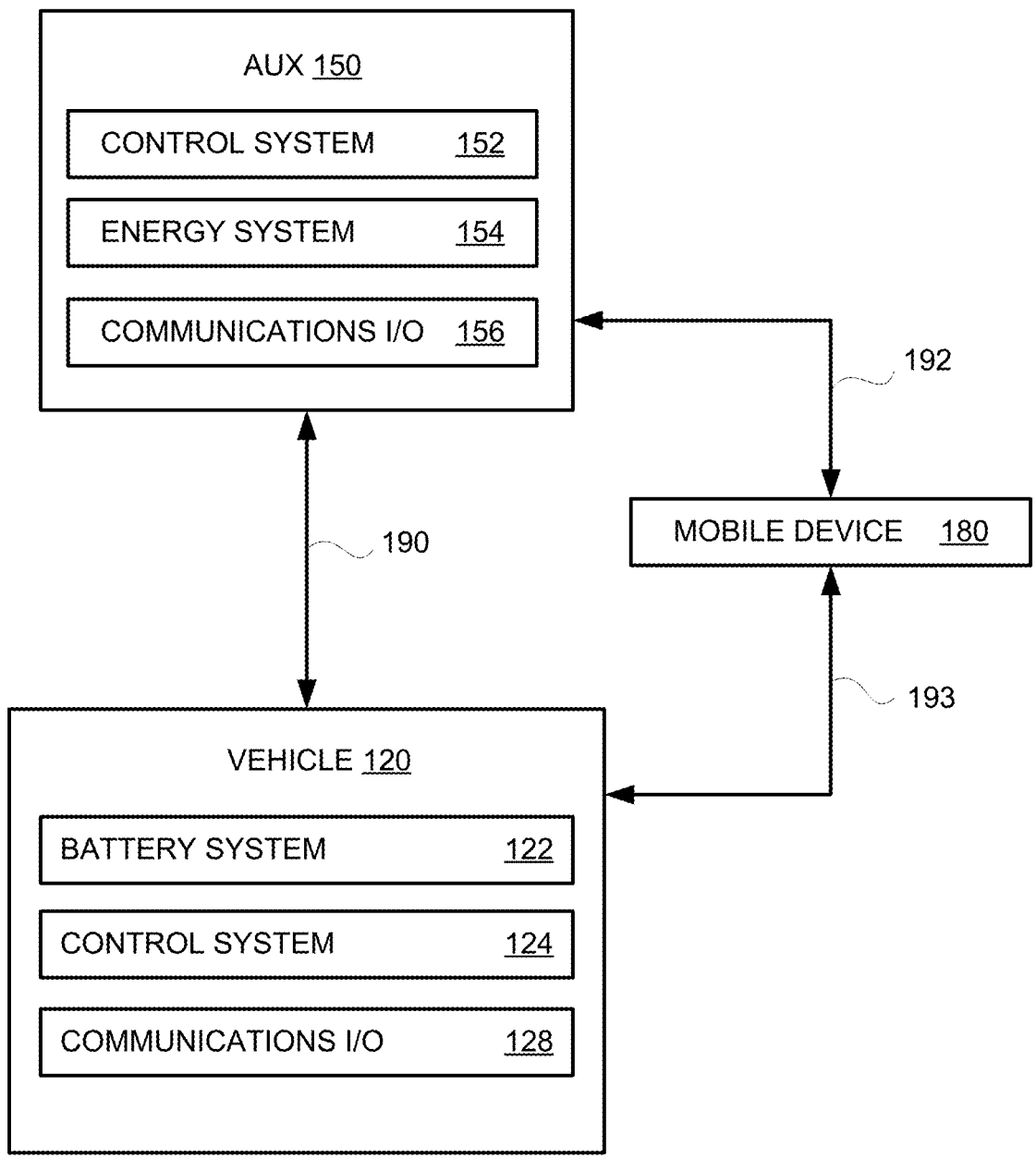
FIG. 1 shows a block diagram of an illustrative vehicle system having an auxiliary energy system, in accordance with some embodiments of the present disclosure.

FIG. 1 shows a block diagram of illustrative vehicle system 100 having an auxiliary energy system, in accordance with some embodiments of the present disclosure. System 100 includes vehicle 120, auxiliary system 150, mobile device 180, and illustrative cable(s) 190, in accordance with some embodiments of the present disclosure.

Vehicle 120 includes battery system 122, control system 124, and communications I/O 128. Battery system 122 may include one or more battery cells, contactors, DC buses power electronics, control circuitry, sensors, electrical terminals and ports (e.g., having any suitable interface or connector), or any combination thereof. Control system 124 may be integrated into the vehicle's primary control system, included as a stand-alone unit installed in the vehicle (e.g., and optionally powered by the vehicle), or a combination thereof (e.g., an after-market system that is installed integral to the vehicle). Communication I/O 128 is optionally included to communicate with optional mobile device 180, auxiliary system 150, or both, for example. In some embodiments, communications I/O 128 may include Internet connectivity, and accordingly may interact with a web application.

In some embodiments, vehicle 120 includes a cooling system for providing cooling fluid to one or more components of vehicle 120. In some embodiments, the cooling system provides coolant to battery system 122, auxiliary system 150, or both.

Auxiliary system 150 includes control system 152, energy system 154, and communications I/O 156. In some embodiments, auxiliary system 150 is configured to communicate with, or otherwise be electrically coupled to, vehicle 120 via link 190. In some embodiments, auxiliary system 150 is configured to communicate with mobile device 180 via communications link 192. Communication I/O 156 is optionally included to communicate with optional mobile device 180, vehicle 120, or both, for example.

Optional mobile device 180 is configured to communicate with auxiliary system 150, vehicle 120, or both. In some embodiments, mobile device 180 is configured to communicate with vehicle 120 via communications link 193. Mobile device 180 may include, for example, a tablet computer, a smart phone, a key fob, a smart watch, another other suitable device, or any combination thereof. Communications links 192 and 194 may include Bluetooth, WiFi, 3G, 4G, 5G, near-field communication (NFC), any other suitable communications link, or any combination thereof. In some embodiments, mobile device 180 includes one or more software applications configured to provide information to, and receive information from, vehicle 120 and auxiliary system 150.

In some embodiments, auxiliary system 150 includes a secondary battery pack that includes a comm port (e.g., as part of comm I/O 156), a high-voltage DC connector, fluid ports (e.g., for coolant flow), any other suitable ports or interfaces, or any combination thereof. In some embodiments, the secondary battery pack (e.g., energy system 154 may include battery cells, contactors, power electronics, and any other suitable components) is configured to match the DC bus voltage of battery system 122. In some embodiments, the auxiliary system 150 (e.g., or energy system 154 thereof) is configured to mate with bulkhead ports, a cable pigtail (e.g., cable(s) 190), or both to transfer electrical power with battery system 122. In some embodiments, one or more contactors are configured to interrupt poles of the DC bus between energy system 154 and battery system 122. In some embodiments, cable(s) 190 is configured to transmit communication signals between auxiliary system 150 and vehicle 120. For example, in some embodiments, the energy system 154 is configured to communicate over isolated serial peripheral interface ("ISO/SPI") via cable(s) 190 using a comm port.

In some embodiments, energy system 154 includes a module stack (e.g., a series count). In some embodiments (not shown), auxiliary system 150 includes fluid ports for accommodating fluid for cooling. In some embodiments, the fluid ports are coupled to the same cooling manifold as for battery system 122. In some embodiments, auxiliary system 150 includes a sealed outer housing.

Figure 2:
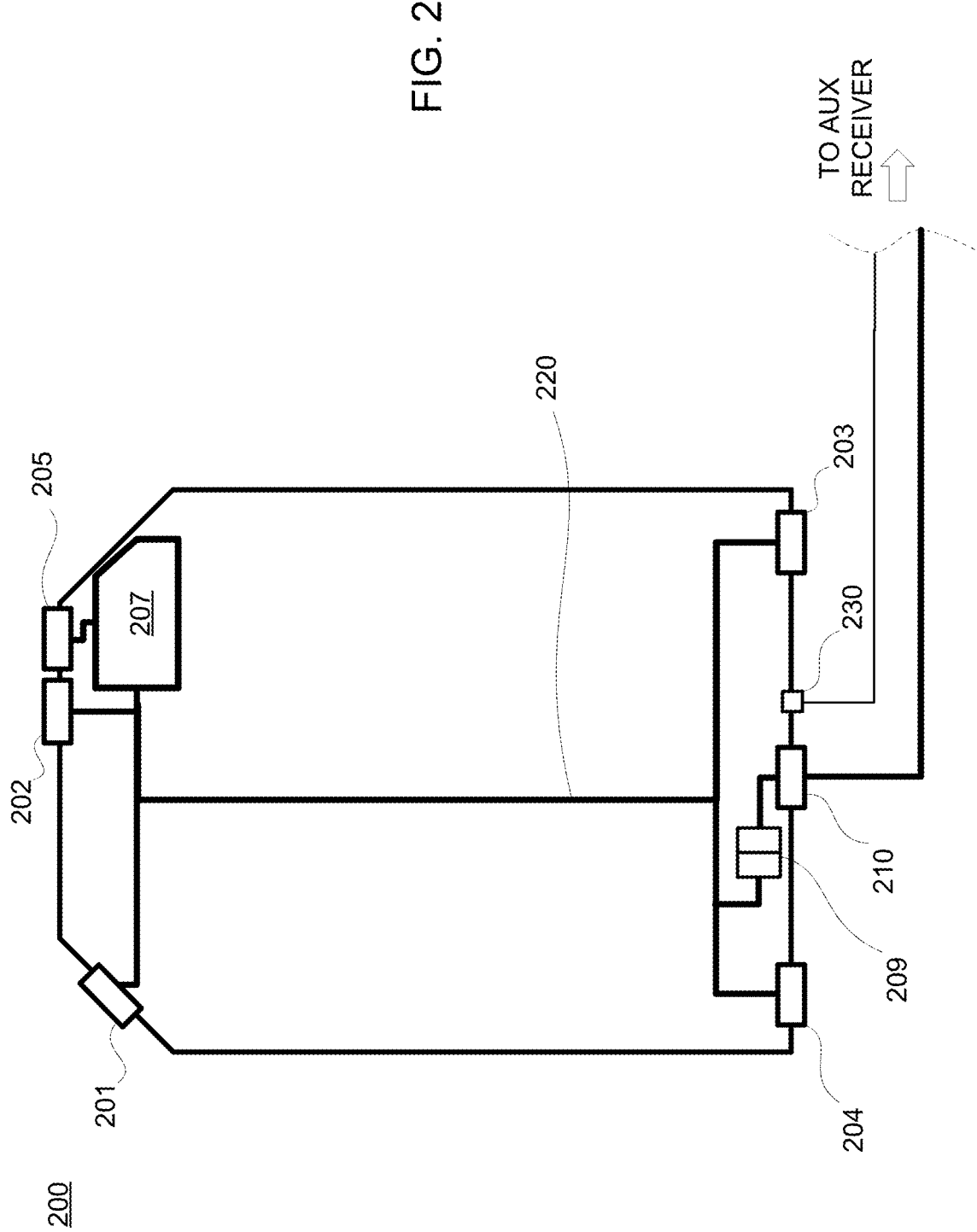
FIG. 2 shows a block diagram of an illustrative battery system, in accordance with some embodiments of the present disclosure.

FIG. 2 shows a block diagram of illustrative battery system 200, in accordance with some embodiments of the present disclosure. System 200 includes ports 201, 202, 203, and 204 for, respectively, a front left drive unit (FDU-L), a front right drive unit (FDU-R), a rear left drive unit (RDU-L), and a rear right drive unit (RDU-R). System 200, as illustrated, includes DC charge port 205, coupled to DC bus switch 207, and configured to be coupled to a charging station (not shown) to increase the state of charge (SOC) of the battery pack. System 200, as illustrated, includes auxiliary port 210, coupled via auxiliary contactor 209 to DC bus 220 of the battery pack (e.g., a "switched" connection, in parallel with the main pack). In some embodiments, auxiliary contactor 209 may, for example, be controlled by control circuitry (e.g., control system 124 or 152 of FIG. 1, or any other suitable control system or combination thereof). System 200, as illustrated, includes communications port ("comm port") 230 configured to transmit and receive communications signals. For example, comm port 230 may be configured to support digital communication (e.g., Modbus, CANbus, ethernet, two-wire serial, any other suitable communication architecture, or any combination thereof). For example, comm port 230 may include a plurality of screw or clamp electrical terminals, an electrical connector (e.g., a mil-spec twist lock connector, a DB connector, an RJ-45 connector), an optical fiber connection, any other suitable communications connection interface, or any combination thereof. In some embodiments, auxiliary port 210 enables a secondary battery pack (e.g., an auxiliary battery pack) to be coupled to the main battery pack.

Figure 3:
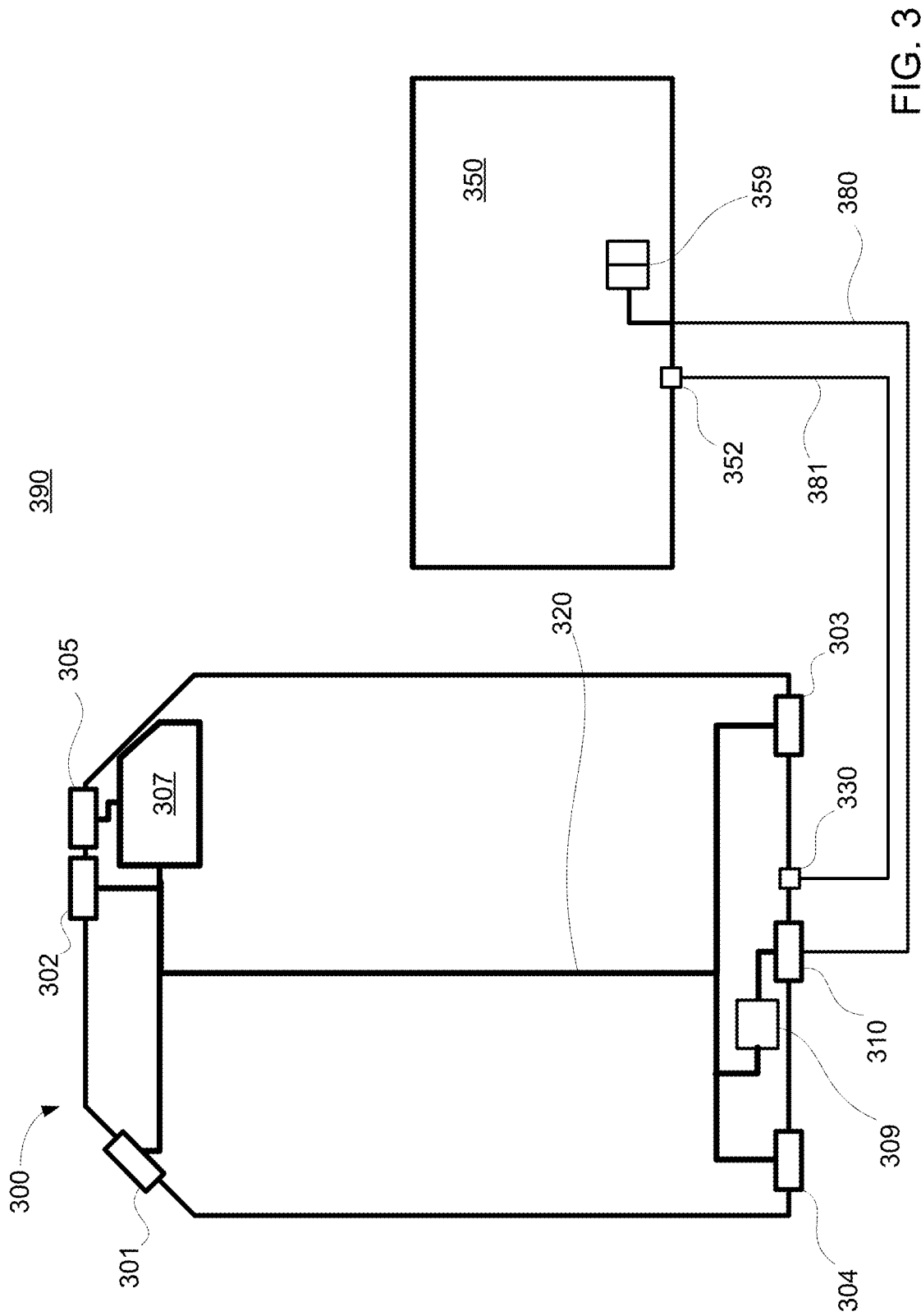
FIG. 3 shows a block diagram of an illustrative battery system including a secondary battery pack, in accordance with some embodiments of the present disclosure.

FIG. 3 shows a block diagram of illustrative battery system 390 including system 300 and secondary battery pack 350 (referred to as a mega pack), in accordance with some embodiments of the present disclosure. As illustrated, system 300 is similar to system 200 of FIG. 2, although system 300 need not be (e.g., system 300 may include a suitable battery system of an electric vehicle). System 300, as illustrated, includes ports 301-304 for, respectively, a front left drive unit (FDU-L), a front right drive unit (FDU-R), a rear left drive unit (RDU-L), and a rear right drive unit (RDU-R). System 300, as illustrated, includes DC charge port 305, coupled to DC bus switch 307, and configured to be coupled to a charging station to increase the SOC of the battery pack. System 300, as illustrated, includes mega port 310 (e.g., with shunt 309 in place rather than auxiliary contactor 209 as in FIG. 2) connected to DC bus 320 of the battery pack (e.g., shunt 309 is in parallel with the DC bus). Instead of an auxiliary contactor, mega contactors 359 are included in secondary battery pack 350 and may, for example, be controlled by control circuitry. Mega contactors 359 provide a switched connection to the main DC bus (e.g., DC bus 320) of the main pack (e.g., system 300). In some embodiments, mega contactors 359 of FIG. 3 are identical to auxiliary contactors 209 of FIG. 2, except for the location. In some embodiments, the current capacity of mega contactors 359 and auxiliary contactors 209 are different. For example, mega contactors 359 may have a higher current capacity. By arranging mega contactors 359 in secondary battery pack 350, the voltage lines that extend from the secondary battery pack are switched lines (e.g., lines 380). This may be preferable when secondary battery pack 350 has a high energy capacity. System 300, as illustrated also includes communications port ("comm port") 330 configured to transmit and receive communications signals between the system 300 and secondary battery pack 350 (e.g., communications port 352 thereof). Secondary battery pack 350 may be added to the vehicle to extend range, increase power, provide redundancy, or a combination thereof.

In some embodiments, system 300 (e.g., the main pack) and secondary battery pack 350 (e.g., an auxiliary or mega pack) are configured to operate at a predetermined nominal DC voltage. For example, secondary battery pack 350, system 300, or both, may include a pre-charge circuit configured to reduce voltage differences across the auxiliary or mega contactors (e.g., contactors 359) when they are closed to begin current flow (e.g., to prevent large transient currents). In some embodiments, comm ports 330 and 352 may be used to transmit communications signals including diagnostics, flags, error messages, parameter values, clock or edge signals, commands, status updates, any other suitable information, or any combination thereof. In some embodiments, the main battery pack of system 300 and secondary battery pack 350 are impedance-matched. In some embodiments, system 300 and secondary battery pack 350 are coupled by a DC-DC converter. For example, if the main battery pack of system 300 and secondary battery pack 350 operate at different nominal DC voltages, either or both may include a DC-DC converter to level shift either voltage to a common operating voltage. In a further example, the voltage of secondary battery pack 350 may be converted to that of the main battery pack of system 300 by a DC-DC converter.

In some embodiments, the main battery pack of system 300 includes control circuitry. In some embodiments, secondary battery pack 350 also includes control circuitry configured to communicate with that of system 300 using respective comm ports 330 and 352, which may be coupled together by link 381.

In some embodiments, mega port 310 of FIG. 3 and mega port 210 of FIG. 2 enable connection to a load or additional capacity. For example, additional battery capacity such as an auxiliary battery pack may be added to increase available electrical power. In a further example, electrical loads such as appliances (e.g., a portable kitchen), powered tools, heaters, lights, or any other suitable electrical load may be coupled to the port.

In an illustrative example, system 300 includes a main DC bus, which is coupled to a main battery pack. In some embodiments, the main DC bus is a switched bus. When an auxiliary pack is coupled to the main pack (e.g., coupled to the main DC bus thereof), if the main pack is damaged, the main pack can be switched off and the main switched DC bus can be used to power components (e.g., a vehicle powertrain) from the auxiliary pack. Accordingly, the main DC bus may be arranged with the main pack and auxiliary pack coupled in parallel to the electrical load (e.g., electric motors of the vehicle powertrain).

Figure 4:
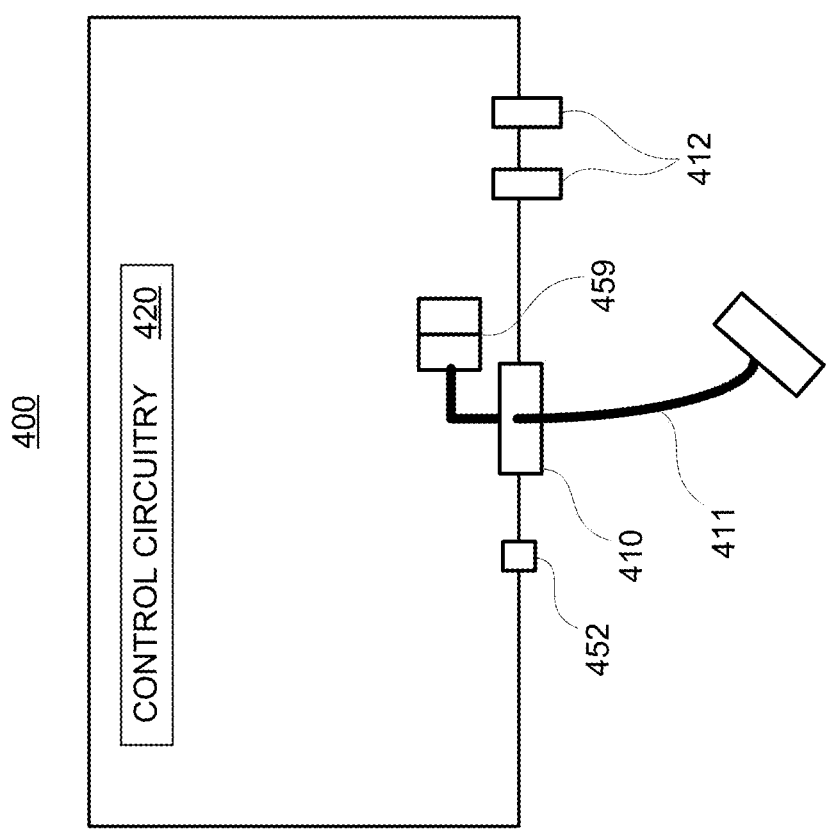
FIG. 4 shows a block diagram of an illustrative secondary battery pack, in accordance with some embodiments of the present disclosure.

FIG. 4 shows a block diagram of illustrative secondary battery pack 400, in accordance with some embodiments of the present disclosure. Secondary battery pack 400, as illustrated, includes comm port 452, high-voltage DC connector 410 (e.g., with pigtail 411 connected, as illustrated), fluid ports 412 (e.g., for supplying and returning coolant flow), any other suitable ports or interfaces, or any combination thereof. In some embodiments, secondary battery pack 400 is configured to match the DC bus voltage of a main battery pack (e.g., secondary battery pack 400 has an operating voltage nominally the same as a main pack). In some embodiments, secondary battery pack 400 is configured to mate with bulkhead ports, a cable pigtail (e.g., pigtail 411), or both to transfer electrical power with a main battery pack. In some embodiments, auxiliary or mega contactors 459 are configured to interrupt both poles of the DC bus (e.g., as two single throw, single-pole contactors or as a single throw, two-pole contactor). For example, as illustrated herein, all DC bus lines include a high bus line and a low bus line, although shown as a single line in FIGS. 1-4. In some embodiments, secondary battery pack 400 is configured to communicate (e.g., send and receive communications signals) via comm port 452. For example, in some embodiments, secondary battery pack 400 is configured to communicate over isolated serial peripheral interface ("ISO/SPI") using comm port 452.

In some embodiments, secondary battery pack 400 includes a module stack (e.g., 108 cells in series, referred to herein as "series count"), with any suitable number of cells electrically connected in parallel. In some embodiments, the series count of secondary battery pack 400 is the same as the series count of the main pack, but with a different number of cells in parallel (e.g., a smaller number). In some embodiments, secondary battery pack 400 includes an internal contactor (e.g., a two-pole contactor, or pair of contactors, such as contactor 459) with an associated pre-charge circuit (not shown). In some embodiments, secondary battery pack 400 includes an integrated current sensor configured to measure a current of a DC bus therein. In some embodiments, secondary battery pack 400 includes control circuitry 420 configured for current sensing, contactor control, voltage sensing (e.g., to measure voltage of the DC bus in time), communicating via ISO/SPI to external control circuitry (e.g., control circuitry of a main battery pack), any other suitable circuitry, or any combination thereof. In some embodiments, secondary battery pack 400 includes one or more internally fused high voltage bus lines. In some embodiments, secondary battery pack 400 includes fluid ports 412 for module cooling. In some embodiments, fluid ports 412 are coupled to the same cooling manifold as for the main battery pack. In some embodiments, secondary battery pack 400 includes a sealed outer housing (e.g., the secondary pack is not included in or integrated into the main pack).

In some embodiments, the system architecture helps achieve a parallel connection (e.g., by using one or more contactors and a pre-charge circuit). In some embodiments, a main pack may include a set of switched DC bus lines running the length of the pack to control circuitry (e.g., a high-voltage distribution block (HVDB) configured to switch and manage a DC bus). The auxiliary contactors aid in reducing a safety risk of un-switched DC bus lines, a permanently energized HV connector port, or both. In some embodiments, different types of secondary battery packs may be configured to couple to the auxiliary or mega port of a main battery pack, thus providing flexibility and changeability.

Figure 5:
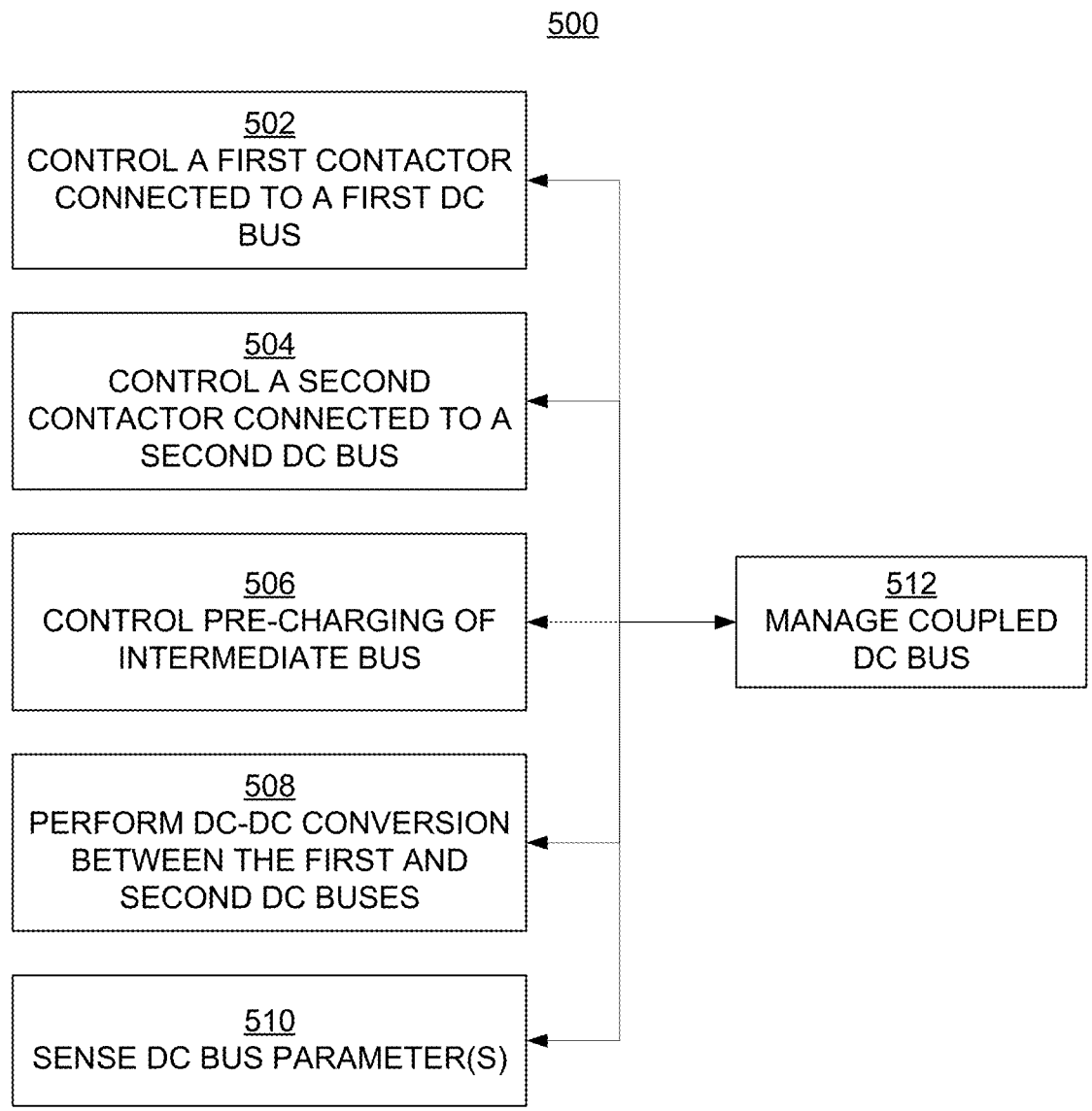
FIG. 5 shows a flowchart of an illustrative process for managing an auxiliary energy system, in accordance with some embodiments of the present disclosure.

FIG. 5 shows a flowchart of illustrative process 500 for managing an auxiliary energy system, in accordance with some embodiments of the present disclosure. Process 500 may be implemented by any suitable control circuitry, which may reside in a main battery pack, a secondary battery pack, a mobile computing device, any other suitable computing device, or any combination thereof. For example, any suitable control circuitry of FIGS. 1-4 may implement some or all of process 500.

At step 502, the control circuitry controls a first contactor connected to a first DC bus. For example, the first DC bus may be included as part of a main battery pack. In some embodiments, the control circuitry transmits a control signal to a control terminal of the first contactor (or relay, solid state device) to open or close the first contactor.

At step 504, the control circuitry controls a second contactor connected to a second DC bus. For example, the second DC bus may be included as part of a secondary battery pack. In some embodiments, step 504 need not be performed. For example, in some embodiments, a single contactor may be used to couple two DC buses. In some embodiments, the control circuitry transmits a control signal to a control terminal of the second contactor (or relay, solid state device) to open or close the second contactor.

In some embodiments, steps 502 and 504 may be performed at the same time, in sequence, or in any other suitable cadence. When the first contactor, second contactor, or both, are open (e.g., no current flow), an intermediate DC bus may exist between conductors between the first DC bus and second DC bus. In an illustrative example, referencing FIG. 3 wherein shunt 309 is replaced with contactor 209, contactors 209 and 359 may be controlled to couple the respective DC buses of system 300 and secondary battery pack 350.

At step 506, the control circuitry controls pre-charging of an intermediate bus. Because the first and second DC buses may be at different nominal voltages, or at different voltages levels, pre-charging may be desired to avoid large current flows upon connection due to differences in voltage and a low impedance along conductors. Controlling pre-charge may include limiting current, sensing a voltage difference, controlling impedance, controlling an open/close schedule of the contractor (e.g., using pulse width modulation or other modulation).

At step 508, the control circuitry performs a DC-DC conversion between the first and second DC buses. In some embodiments, if the first and second DC buses operate at nominally different voltages, a DC-DC converter is used to maintain the two DC buses while allowing electrical power to be transferred between the DC buses. In some embodiments, DC-DC conversion and pre-charging may be controlled as a single operation (e.g., by controlling a single device).

At step 510, the control circuitry senses one or more bus parameter(s), receives one or more sensor signals from sensors configured to sense bus parameter(s), or a combination thereof. Sensors may be configured to sense current, voltage, impedance, frequency, any other suitable electrical parameter, or any combination thereof. For example, a current sensor may be used to determine whether a fault condition exists. In some embodiments, the control circuitry may operate on one or more sensor signals to determine DC bus parameter(s). For example, the control circuitry may be configured to filter (e.g., digital filter or analog filter, of any suitable filter character), transform (e.g., a Fourier transform, a wavelet transform), normalize, amplify, differentiate, integrate (e.g., perform quadrature), perform any other suitable operation, or any combination thereof.

At step 512, the control circuitry manages the coupled DC bus. The control circuitry may manage the coupled DC bus by performing any of steps 502, 504, 506, 508, and 510, in response to any suitable trigger. For example, the control circuitry may be configured to open or close the first and second contactors to disconnect or connect the DC buses. In a further example, the control circuitry may close the first and second contactors to form a coupled DC bus, monitor one or more electrical parameter(s) of the coupled DC bus, and if there is a fault, disconnect the first DC bus from the second DC bus.

Figure 6:
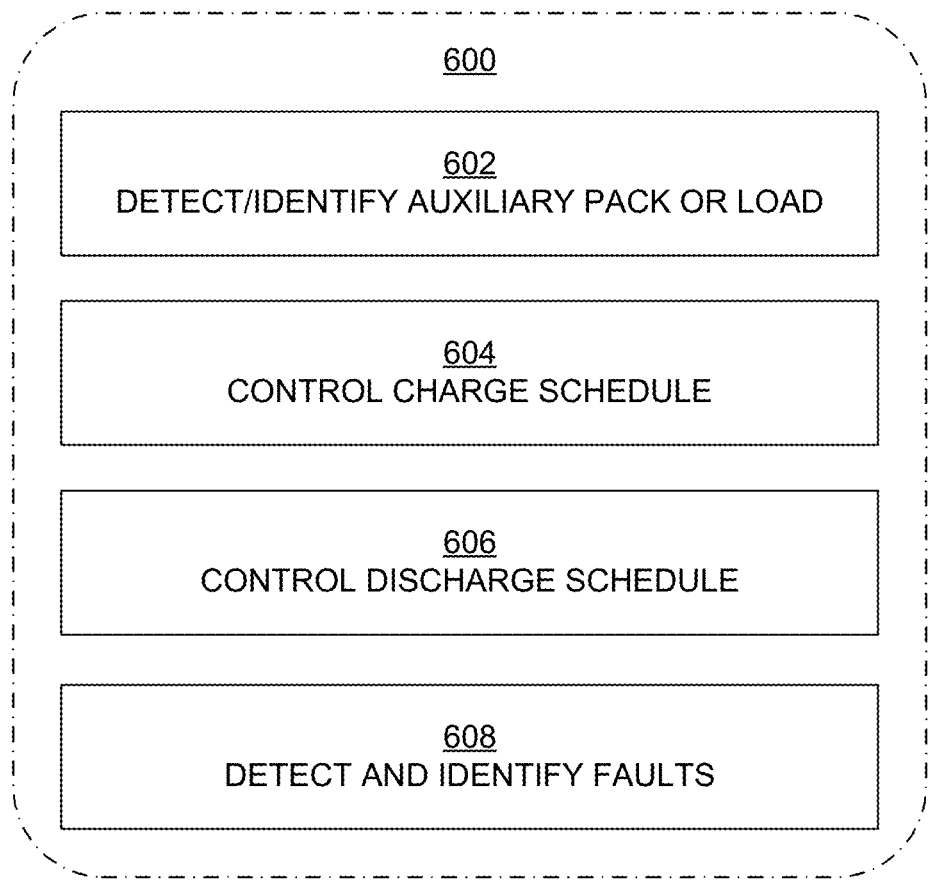
FIG. 6 shows a flowchart of an illustrative process for managing an auxiliary energy system, in accordance with some embodiments of the present disclosure.

FIG. 6 shows a flowchart of illustrative process 600 for managing an auxiliary energy system, in accordance with some embodiments of the present disclosure. Process 600 may be implemented by any suitable control circuitry, which may reside in a main battery pack, a secondary battery pack, a mobile computing device, any other suitable computing device, or any combination thereof. For example, any suitable control circuitry of FIGS. 1-4 may implement some or all of process 600.

Step 602 includes detecting, identifying, or both, an auxiliary pack or load connected to a mega port (e.g., mega port 310 of FIG. 3). In some embodiments, link 381 between comm ports 330 and 352 may allow control circuitry of a main pack, an auxiliary pack, or both to detect each other. For example, a main pack and auxiliary pack, or load, may have a dedicated communications address (e.g., an IP address, a hardware address, or both) that may be identified when communicatively coupled. In some embodiments, information about the auxiliary pack or load may also be identified. For example, capacity information (e.g., current capacity, energy capacity), safety information (e.g., breaker or fuse ratings, voltage or current ratings, temperature ratings, compatibility information), operating information (e.g., recommended operating parameters, recommended operating modes), any other suitable information, or any combination thereof.

Step 604 incudes control circuitry controlling a charge schedule for a main pack, a secondary device (e.g., an auxiliary pack or load), or both when the main pack and secondary device are coupled together. In some embodiments, when a main pack is coupled to an auxiliary pack, the control circuitry may control charging the main battery pack and the auxiliary pack. For example, when an auxiliary pack is added that has higher or lower state of charge (SOC) then the main pack, the control circuitry controls the contactors such that the pack having a lower SOC is charged first until the SOC reaches that of the other pack and then both are charged together.

Step 606 incudes control circuitry controlling a discharge schedule for a main pack, a secondary device (e.g., an auxiliary pack or load), or both when the main pack and secondary device are coupled together. In some embodiments, when a main pack is coupled to an auxiliary pack, the control circuitry may control discharging the main battery pack and the auxiliary pack. For example, if the main pack has a higher SOC, then the control circuitry may operate vehicle off of the main pack until its SOC reaches the SOC of the auxiliary pack and then switch the load to be powered by both the main pack and the auxiliary pack. If the auxiliary pack has a higher SOC than the main pack, then the control circuitry may cause both the auxiliary pack and main pack to be used if the auxiliary pack is not of sufficient capacity to fully operate the load (e.g., the vehicle powertrain) and then equalize the load, SOC, or both on the packs during next charging cycle. In some embodiments, the control circuitry may be configured to discharge the main pack or the auxiliary pack first, before discharging the other pack. For example, if the auxiliary pack is a replaceable pack, the control circuitry may be configured to discharge the auxiliary pack first before discharging the main pack. In this way, if the vehicle is on a long trip and a service stop is available with a supply of charged replacement packs, a discharged auxiliary pack can be swapped with a charged replacement pack. This enables the main pack to maintain a higher SOC and maximizes the range of the vehicle. In some such embodiments, when the auxiliary pack has lower current capacity than the main battery pack, the vehicle can be operated in a lower power mode when only the auxiliary pack is being discharged. Control circuitry of the vehicle can monitor power demands and also anticipate power demands (e.g., back on upcoming road conditions) of the vehicle and switch between lower and higher modes (e.g., by connecting and disconnecting the main pack) to provide sufficient power to the vehicle.

Step 608 incudes control circuitry monitoring the system for faults (e.g., electrical, thermal, communications, or otherwise). In some embodiments, if the control circuitry detects a fault in either the main pack or secondary device, then the control circuitry causes disconnection of the affected device and allows continued operation. For example, while in a normal operating mode, if auxiliary pack experiences a fault, the control circuitry may cause the auxiliary pack to be disconnected. In a further example, the control circuitry may cause a reduced power mode to be achieved if the main pack has a fault and the auxiliary pack does not have sufficient capacity to operate in the normal mode.

It will be understood that any of the illustrative steps of processes 500 and 600 of FIGS. 5-6 may be omitted, combined, modified, or otherwise altered in accordance with the present disclosure. For example, control circuitry may be configured to perform any of the illustrative steps of process 500 of FIG. 5, wherein step 512 may include any or all of the illustrative steps of process 600 (e.g., any or all of steps 602, 604, 606, and 608).

The foregoing is merely illustrative of the principles of this disclosure, and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A battery system, the battery system comprising:
a main battery configured to be integrated into a vehicle and electrically coupled to a switched DC bus via a main contactor;
a secondary battery that is removable from the vehicle and electrically coupled to the switched DC bus via a secondary contactor; and
a pre-charge circuit, electrically integrated into the vehicle, configured to modify a voltage difference between the main battery and the secondary battery prior to electrically coupling the secondary battery to the main battery,
wherein the main battery and the secondary battery comprise different current capacities.

2. The battery system of claim 1, wherein the main battery and the secondary battery comprise an operating voltage.

3. The battery system of claim 1, wherein the secondary battery comprises a lower current capacity than the main battery.

4. The battery system of claim 1, further comprising a DC bus cable, wherein:
the main battery comprises a first port;
the secondary battery comprises a second port; and
the DC bus cable is coupled to the first port and the second port, thereby electrically coupling the secondary battery to the main battery.

5. The battery system of claim 4, wherein the secondary battery is electrically coupled in parallel to the main battery.

6. The battery system of claim 4, wherein the secondary contactor is electrically coupled between the switched DC bus and the first port of the main battery.

7. The battery system of claim 4, wherein the secondary contactor is electrically coupled between a bus coupled to battery cells of the secondary battery and the second port of the secondary battery.

8. The battery system of claim 1, wherein the main battery comprises:
a charging port coupled to the switched DC bus and configured to be coupled to a charging system; and
at least one driving unit port coupled to the switched DC bus and configured to transfer electrical power with at least one electric motor.

9. The battery system of claim 1, wherein the switched DC bus comprises a low voltage bus line and a high voltage bus line.

10. The battery system of claim 1, wherein the main battery comprises:
a first plurality of battery cells; and
a first DC bus coupled to the first plurality of battery cells, wherein the main contactor is configured to couple to the first DC bus to electrically couple the main battery to the switched DC bus.

11. The battery system of claim 1, wherein the secondary battery comprises:
a second plurality of battery cells; and
a second DC bus coupled to the second plurality of battery cells, wherein the secondary contactor is configured to couple to the second DC bus to electrically couple the secondary battery to the switched DC bus.

12. The battery system of claim 1, wherein the main battery and the secondary battery comprise a same series count of battery cells.

13. The battery system of claim 1, further comprising:
main control circuitry coupled to battery cells of the main battery by sensor leads, wherein the main control circuitry is configured to manage operation of the main battery; and
secondary control circuitry coupled to battery cells of the secondary battery by secondary sensor leads, wherein the secondary control circuitry is communicatively coupled to the main control circuitry.

14. The battery system of claim 13, wherein:
the main battery comprises a first communications port coupled to the main control circuitry;
the secondary battery comprises a second communications port coupled to the secondary control circuitry; and
the first communications port is coupled to the second communications port by a communications link.

15. A method for managing a main battery integrated into a vehicle and a secondary battery, the method comprising:
connecting the main battery and the secondary battery to a switched DC bus when the vehicle is being operated in a high power mode;
selectively charging one of the main battery or the secondary battery by one or more pre-charge circuits to reduce the difference in a state of charge between the main battery and a state of charge of the secondary battery prior to closing one or more of a main contactor of the main battery or a secondary contactor of the secondary battery to connect one or more of the main battery or the secondary battery to the switched DC bus; and
connecting only the secondary battery to the switched DC bus when the vehicle is being operated in a low power mode.

16. The method of claim 15, further comprising switching a current operating mode of the vehicle between the low power mode and the high power mode based on anticipated power demands associated with upcoming road conditions.

17. The method of claim 15, further comprising:
determining the state of charge of the main battery;
determining the state of charge of the secondary battery; and
selectively connecting the main battery and the secondary battery to the switched DC bus based on the state of charge of the main battery and the state of charge of the secondary battery.

18. The method of claim 17, wherein selectively connecting the main battery and the secondary battery comprises connecting the main battery to the switched DC bus when the state of charge of the main battery is lower than the state of charge of the secondary battery, the method further comprising:
charging, by a first one of the one or more pre-charge circuits, the main battery to reduce the difference in the state of charge between the main battery and the secondary battery.

19. The method of claim 17, wherein selectively connecting the main battery and the secondary battery comprises connecting the secondary battery to the switched DC bus when the state of charge of the main battery is higher than the state of charge of the secondary battery, the method further comprising:

charging, by a second one of the one or more pre-charge circuits, the secondary battery to reduce the difference in the state of charge between the main battery and the secondary battery.

20. The battery system of claim 1, wherein the pre-charge circuit comprises a DC-DC conveter is configured to modify the voltage difference between the main battery and the secondary battery.

* * * * *